Patented June 27, 1950

2,512,632

UNITED STATES PATENT OFFICE 2,512,632

PRODUCTION OF NITROGEN-CONTAINING POLYMERS

James Wotherspoon Fisher and Edward William Wheatley, Spondon, near Derby, England, assignors to Celanese Corporation of America, a corporation of Delaware No Drawing. Application April 26, 1949, Serial No. 89,806. In Great Britain May 10, 1948

10 Claims. (Cl. 260—78)

This invention relates to improvements in the production of polymers and is more particularly concerned with the production of linear nitrogen-containing polymers and their further treatment to make additional nitrogen-containing polymers whether linear or cross-linked.

In our U. S. application S. No. 726,964, filed February 6, 1947, we have described the production of linear co-polymers by reactiong a linear polymer containing the 1.2.4-triazole nucleus (obtainable, for example, according to U. S. applications S. Nos. 662,628 filed April 16, 1946 and 609,031 filed August 4, 1945, by condensation of a dihydrazide of a dicarboxylic acid in presence of hydrazine) with a bifunctional substance containing two amide-forming groups at least one of which is complementary to a terminal group of said polymer, the reaction being carried out with the reagents in a mobile state so that the polymer remains linear. We have now found, and this forms part of the subject-matter of our co-pending U. S. application S. No. 91,227 filed May 3, 1949, that certain of the polymers of this prior U. S. application S. No. 726,964 have a good affinity for substantive cotton dyestuffs. So far as we are aware, these are the first nitrogen-containing polymers which have a good affinity for these dyestuffs. So high is the avidity of some of the polymers for the cotton dyestuffs that when yarns or other materials made of the polymers are placed in an ordinary dyebath made up with a substantive cotton dyestuff together with cotton materials, the polymer absorbs substantially all the dyestuff, leaving the cotton white.

The polymers which have this property are those which are obtained by condensing a linear polyaminotriazole with terminal hydrazide groups (i. e. the polymer as obtained from a dihydrazide of a dicarboxylic acid) with an already formed polyamide which has terminal amino groups (e. g. a diamine-stabilised polyamide) or with the constituents necessary to make such a polyamide with terminal amino groups. The production of such polymers is exemplified in Examples 12, 15 and 16 of U. S. application S. No. 726,964. Similar polymers may be produced by condensing a hydrolysed polyaminotriazole (i. e. a polymer having terminal carboxy groups) with hydrazine and a diamine-stabilised polyamide or its constituents.

This remarkable affinity for cotton dyes suggests that the mechanism either of the absorption of the dyestuff or of the retention by the polymer of the dyestuff is quite different from that operating in the case of cotton, viscose artificial silk or similar materials which have an affinity for these colours, and it seems probable that this mechanism may be attributed to the presence in the polymer of an amidine grouping, particularly if part at least of such amidine grouping is attached as a side chain to the main polymer chain. By "amidine grouping" we include not only the simple amidine of the structure

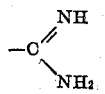

but also substituted amidine groupings, and particularly the substituted amidine groupings known as the amidrazone grouping

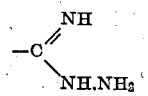

or

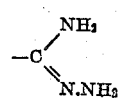

and the hydrazidine grouping

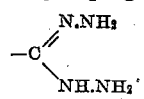

It appears desirable that at least one of the substituents on the amidine carbon atom should be a hydrazine residue.

Proceeding on this view of the matter, we have been able to prepare further polymers which have a good affinity for substantive cotton colours and which, judging from their mode of preparation, also contain the amidine grouping. Thus, for example, we have found that by heating together one molecule of a dihydrazide of a dicarboylic acid, two molecules of a diamine and one molecule of a dicarboxylic acid under conditions comparable with those used in forming the co-polymers in our U. S. application S. No. 726,964, a polymer is produced which again has a very remarkable affinity for cotton colours. Thus we have produced a polymer from adipic dihydrazide, hexamethylene diamine and adipic acid in the above proportions which has a melting point of about 235° C., while a similar product obtained from one mole of sebacic dihydrazide, two moles of hexamethylene diamine and one mole of adipic acid melts at 185–190° C. Both these products have a very high affinity for cotton dyestuffs and can be melt spun into filaments. Similarly, new polymers can be produced from a diamine and a dicarboxylic acid in substantially equimolar proportions together with free hydrazine, or again the diacid may be used wholly or in part in the form of its diester, for example its dimethyl or diethyl ester. In the above preparation of a polymer, the diamine and dicarboxylic acid may be replaced by the polyamide formed by their combination, that is to say by a polyamide containing amino groups at both ends.

Other variants may be used in such a synthesis of new polymers, and it appears generally that to obtain a fibre-forming polymer having affinity for cotton colours the number of carboxylic acid groups in the mixture should be less than the total number of amino groups plus hydrazine residues in the mixture, or in other words the sum of the amino groups and hydrazine groups should be in excess of the number of carboxylic groups. In addition, the number of amino groups should not substantially exceed the number of carboxylic groups, since otherwise a polymer of relatively low molecular weight is likely to be produced. In calculating the relative proportions of the various groups in the mixture, it should be borne in mind that an excess of hydrazine in no way limits the molecular weight which can be attained, whereas an excess of amino groups does so limit the molecular weight. Hence the amino groups should not exceed the number of carboxylic groups by more than about 2% in order to achieve a high molecular weight, and preferably by not more than about 0.2–1%. In one of the most favourable methods of obtaining the new polymers according to the present invention, the carboxylic groups present in the mixture should be substantially equal, within the above limits of under 2% and preferably between 0.2 and 1%, to the number of amino groups present, so that the hydrazine present gives basicity to the mixture. The hydrazine may then be used in relatively small proportions, for example 5% to 10%.

Generally, therefore, the new nitrogen-containing polymers are produced by heating together hydrazine, a dicarboxylic acid and another bifunctional amide-forming component, the component, the components being so proportioned that the sum of the amino groups and hydrazine groups present exceeds the number of carboxylic groups present, preferably by at least 5% and still better by 10 or 20 or even 25% or more, and the number of amino groups does not substantially exceed the number of carboxylic groups. Preferably the number of amino groups does not exceed the number of carboxylic groups by more than 1%.

As already indicated, the general conditions for forming the new polymers are similar to those used in U. S. application S. No. 726,964. As in that application, in order to obtain linear polymers the reagents should be used in a mobile condition, that is to say either dissolved in a solvent or in the molten state, and preferably the temperature conditions are kept below those at which cross-linking tends to set in, and particularly below about 260° C. Favourable temperatures are of the order of 200–260° C.

The invention includes the production of filaments, films and other articles from linear polymers produced as described above. Generally the most suitable method of producing filaments is by melt spinning, i. e. by extruding a melt of the polymer through suitable orifices. In general the temperature of the polymer to be extruded should be some 10–30° above the melting point of the polymer. This melting temperature may be modified to some extent, e. g. with a view to reducing any tendency to decomposition during spinning at very high temperatures, by mixing the polymer with suitable proportions of plasticisers, for example sulphonamide plasticisers, phenolic plasticisers, urea and thiourea plasticisers. Such plasticisers may either be left in the products or may be partially or completely extracted therefrom. Filaments may also be produced by wet or dry spinning methods from solutions in suitable solvents, for example formic acid or acetic acid or phenolic solvents.

The filaments so formed may, if the polymer be of sufficiently high molecular weight, be drawn out at comparatively low temperatures, or even at atmospheric temperature, to very fine filaments having high tenacity and good elasticity. The resulting filaments may then be used for any of the purposes to which artificial silks have in the past been applied. The affinity of the products for cotton colours has already been referred to above. In addition, the products generally have an affinity for the dispersed insoluble type of dyestuff now generally applied to cellulose acetate, and also exhibit a good affinity for the acid wool colours.

While the invention is especially directed to the manufacture and application of fibre-forming polymers, it is not limited thereto and embraces the production of similar polymers suitable, for example, for use as softening agents, coatings, film-forming substances, and the like. Moreover, for these applications the polymers of the present invention may be mixed with other fibre-forming, film-forming or lacquer substances or other ingredients, for example cellulose acetate, aceto-butyrate and aceto-stearate, ethyl cellulose, oxyethyl cellulose, oxyethyl cellulose acetate, benzyl cellulose and other cellulose derivatives, plasticisers or softening agents, dyestuffs and pigments.

The following examples illustrate the invention but do not limit it in any way:

*Example 1*

200 parts by weight of dimethyl adipate and 300 parts by weight of hexamethylene diamine were refluxed in 162 parts by weight of methanol for 3 hours, and then the methanol and excess hexamethylene diamine were removed by heating the whole for 1½ hours at 240° C. in a current of nitrogen. The residue was a waxy solid, melting point 180–185° C., and the nitrogen content was about 15.3%. It was apparently a low polymer, the terminal groups of which were mostly amino groups.

400 parts by weight of the above intermediate were intimately mixed with 200 parts by weight of adipic dihydrazide and the mixture heated in the melt under nitrogen at 200–220° C. A clear melt was obtained, ammoniacal vapours being evolved, and the heat treatment was continued for 1 hour under these conditions, the temperature then raised to 240° C. and the pressure reduced to an absolute pressure of 2 mms. of mercury, and heating continued for a further 2 hours under these conditions. At this point the product was a hard brittle light-coloured mass, melting point 220° C. It was further heated in the melt at 260° C. for 1½ hours, again under an absolute pressure of 2 mms. of mercury. The product was a hard light-coloured mass, melting point 230–235°

C. It yielded long fine filaments from the melt which could be cold-drawn to give fibres of good strength. The polymer was insoluble in water, acetone and methanol, and soluble in cresol and formic acid. The nitrogen content was about 15%. The polymer in the form of filaments had an extraordinarily high affinity for cotton colours. For example, by dyeing with Durazol Fast Scarlet 2GS for 2 minutes at 80° C., it was dyed a deep garnet red shade fast to soap scouring. It had a similar high affinity for Chlorazol Sky Blue FF. A similar condensation carried out with adipic dihydrazide and hexamethylene diammonium adipate did not give a polymer having affinity for cotton colours.

*Example 2*

342 parts of the intermediate obtained according to Example 1 from dimethyl adipate and hexamethylene diamine were mixed with 230 parts of sebacic dihydrazide and heated under nitrogen for 2 hours at 220° C., followed by a further 5 hours at the same temperature but under an absolute pressure of 2 mms. of mercury. The polymer obtained was a light-coloured hard brittle mass insoluble in water and acetone, soluble in a mixture of equal volumes of methanol and chloroform and soluble in cresol and formic acid. Its nitrogen content was 16.7% and its intrinsic viscosity $$\left(\frac{\log \lambda r}{\text{concentration}}\right)$$

where $\lambda r$ is the viscostiy of a solution of the polymer in m-cresol divided by the viscosity of m-cresol in the same units and at the same temperature, the viscosity being measured in a solution containing 1 gram of polymer to 100 ccs. of meta-cresol) was 0.78.

A sample of the polymer was extruded from a melt spinning apparatus to give filaments which dyed to a deep garnet red with Durazol Fast Scarlet 2GS in 30 seconds at 75–80° C. The colour was fast to a soap scour at 80° C. with 2 grams per litre of soap. A sample of ordinary polyamide yarn (from hexamethylene diamine and adipic acid) dyed in a similar bath was almost completely stripped of dye by a simple cold water rinse.

*Example 3*

69 parts of sebacic dihydrazide and 34.8 parts of hexamethylene diamine were heated together under nitrogen for 3 hours at 160–170° C. A good clear melt was obtained which gradually increased in viscosity. After 2 hours the material cooled to an opaque mass capable of forming fibres. The heating was continued for a further hour and yielded a hard light-coloured tough opaque mass of melting point 165–170° C. capable of yielding good fibres from the melt. The polymer was insoluble in water and acetone and soluble in methanol, cresol and formic acid. The nitrogen content was about 16.7%. It dyed a deep navy shade with Chlorazol Sky Blue FF.

*Example 4*

300 parts by weight of hexamethylene diammonium adipate and 50 parts by weight of 60% aqueous hydrazine (i. e. 10% hydrazine on the weight of the nylon salt) were heated in an autoclave for 3 hours at 210° C., the maximum pressure reached being 150 lbs. per square inch. At this stage the polymer had a melting point of 208° C. and an intrinsic viscosity, measured as referred to above, of 0.24. The polymer was thereafter heated at 240–250° C. for 1½ hours under an absolute pressure of 2 mms. of mercury. The product then had a melting point of 210° C., an intrinsic viscosity of 0.71 and a nitrogen content of about 16.4%. It was insoluble in water and acetone, slightly soluble in methanol and soluble in cresol and formic acid, and long fine filaments could be formed from the melt which could be cold-drawn. Yarn thus made had an affinity for cotton colours. For example, it was dyed a deep garnet red by dyeing for 15 minutes at 80–90° C. with Chlorazol Fast Scarlet 4BS, the dyeing being fast to scouring in a bath containing 2 grams per litre of soap at the boil. Under similar conditions an ordinary nylon yarn was only stained.

Having described our invention, what we desire to secure by Letters Patent is:

1. Process for the production of a nitrogen-containing polymer, which comprises forming a mixture of components, which mixture on hydrolysis yields hydrazine, a dicarboxylic acid free from reactive groups other than the two carboxylic groups, and a diamine free from reactive groups other than the two amino groups and having at least one hydrogen atom attached to the nitrogen of each amino group, the components being proportioned so that the sum of the amino groups and hydrazine molecules exceeds the number of carboxylic groups by at least 10% and the number of amino groups does not exceed the number of carboxylic groups by more than 2%, and heating the mixture to form the polymer.

2. Process for the production of a nitrogen-containing polymer, which comprises forming a mixture of components, which mixture on hydrolysis yields hydrazine, a dicarboxylic acid free from reactive groups other than the two carboxylic groups, and a diamine free from reactive groups other than the two amino groups and having at least one hydrogen atom attached to the nitrogen of each amino group, the components being proportioned so that the sum of the amino group and hydrazine molecules exceeds the number of carboxylic groups by at least 25% and the number of amino groups does not exceed the number of carboxylic groups by more than 2%, and heating the mixture to form the polymer.

3. Process for the production of a nitrogen-containing polymer, which comprises forming a mixture of components, which mixture on hydrolysis yields hydrazine, a polymethylene dicarboxylic acid free from reactive groups other than the two carboxylic groups, and a polymethylene diamine free from reactive groups other than the two amino groups and having at least one hydrogen atom attached to the nitrogen of each amino group, the components being proportioned so that the sum of the amino groups and hydrazine molecules exceeds the number of carboxylic groups by at least 10% and the number of amino groups does not exceed the number of carboxylic groups by more than 2%, and heating the mixture to form the polymer.

4. Process for the production of a nitrogen-containing polymer, which comprises forming a mixture of a dicarboxylic acid dihydrazide and a diamine, which mixture on hydrolysis yields hydrazine, a dicarboxylic acid free from reactive groups other than the two carboxylic groups, and a diamine free from reactive groups other than the two amino groups and having at least one hydrogen atom attached to the nitrogen of each amino group, the components being proportioned so that the sum of the amino groups and hydrazine molecules exceeds the number of carboxylic groups by at least 10% and the number of amino groups does not exceed the number of carboxylic groups by more than 2%, and heating the mixture to form the polymer.

5. Process for the production of a nitrogen-containing polymer, which comprises forming a mixture of a polymethylene dicarboxylic acid dihydrazide and a polymethylene diamine, which mixture on hydrolysis yields hydrazine, a polymethylene dicarboxylic acid free from reactive groups other than the two carboxylic groups, and a polymethylene diamine free from reactive groups other than the two amino groups and having at least one hydrogen atom attached to the nitrogen of each amino group, the components being proportioned so that the sum of the amino groups and hydrazine molecules exceeds the number of carboxylic groups by at least 10% and the number of amino groups does not exceed the number of carboxylic groups by more than 2%, and heating the mixture to form the polymer.

6. Process for the production of a nitrogen-containing polymer, which comprises forming a mixture of hydrazine and a diamine-dicarboxylic acid salt, which mixture on hydrolysis yields hydrazine, a dicarboxylic acid free from reactive groups other than the two carboxylic groups, and a diamine free from reactive groups other than the two amino groups and having at least one hydrogen atom attached to the nitrogen of each amino group, the components being proportioned so that the sum of the amino groups and hydrazine molecules exceeds the number of carboxylic groups by at least 10% and the number of amino groups does not exceed the number of carboxylic groups by more than 2%, and heating the mixture to form the polymer.

7. Process for the production of a nitrogen-containing polymer, which comprises forming a mixture of hydrazine and a polymethylene diamine-polymethylene dicarboxylic acid salt, which mixture on hydrolysis yields hydrazine, a polymethylene dicarboxylic acid free from reactive groups other than the two carboxylic groups, and a polymethylene diamine free from reactive groups other than the two amino groups and having at least one hydrogen atom attached to the nitrogen of each amino group, the components being proportioned so that the sum of the amino groups and hydrazine molecules exceeds the number of carboxylic groups by at least 10% and the number of amino groups does not exceed the number of carboxylic groups by more than 2%, and heating the mixture to form the polymer.

8. Process for the production of a nitrogen-containing polymer, which comprises forming a mixture of hydrazine and a polyamide obtained by the condensation of a diamine and a dicarboxylic acid, which mixture on hydrolysis yields hydrazine, a dicarboxylic acid free from reactive groups other than the two carboxylic groups, and a diamine free from reactive groups other than the two amino groups and having at least one hydrogen atom attached to the nitrogen of each amino group, the components being proportioned so that the sum of the amino groups and hydrazine molecules exceeds the number of carboxylic groups by at least 10% and the number of amino groups does not exceed the number of carboxylic groups by more than 2%, and heating the mixture to form the polymer.

9. Process for the production of a nitrogen-containing polymer, which comprises forming a mixture of hydrazine and a polyamide obtained by the condensation of a polymethylene diamine and a polymethylene dicarboxylic acid, which mixture on hydrolysis yields hydrazine, a polymethylene dicarboxylic acid free from reactive groups other than the two carboxylic groups, and a polymethylene diamine free from reactive groups other than the two amino groups and having at least one hydrogen atom attached to the nitrogen of each amino group, the components being proportioned so that the sum of the amino groups and hydrazine molecules exceeds the number of carboxylic groups by at least 10% and the number of amino groups does not exceed the number of carboxylic groups by more than 2%, and heating the mixture to form the polymers.

10. The polymer produced by the process of claim 1.

JAMES WOTHERSPOON FISHER.
EDWARD WILLIAM WHEATLEY.

REFERENCES CITED

The following references are of record in the file of this patent:

UNITED STATES PATENTS

| Number | Name | Date |
|---|---|---|
| 2,252,555 | Carothers | Aug. 12, 1941 |
| 2,281,576 | Hanford | May 5, 1942 |
| 2,310,789 | Hunt et al. | Feb. 9, 1943 |
| 2,395,642 | Prichard | Feb. 26, 1946 |